United States Patent [19]
Hazenbroek

[11] Patent Number: 5,188,559
[45] Date of Patent: Feb. 23, 1993

[54] METHOD AND APPARATUS FOR SEPARATING THE LEGS FROM THE BACK OF A POULTRY CARCASS

[76] Inventor: Jacobus E. Hazenbroek, Burg de Zeeuwstraat 52, Numansdorp, Netherlands

[21] Appl. No.: 760,567
[22] Filed: Sep. 16, 1991
[51] Int. Cl.$^5$ .......................................... A22C 21/00
[52] U.S. Cl. ................................................ 452/167
[58] Field of Search ............... 452/167, 166, 170, 149, 452/155

[56] References Cited

U.S. PATENT DOCUMENTS

| | | | |
|---|---|---|---|
| 4,639,975 | 2/1987 | van der Eerden | 452/167 |
| 4,896,399 | 1/1990 | Hazenbroek | 452/167 |
| 4,939,813 | 7/1990 | Hazenbroek | 452/167 |
| 4,951,353 | 8/1990 | Tieleman | 452/167 |
| 5,015,213 | 5/1991 | Hazenbroek | 452/167 |

*Primary Examiner*—Willis Little
*Attorney, Agent, or Firm*—Hopkins & Thomas

[57] ABSTRACT

An apparatus is disclosed for separating the back from the legs of a poultry carcass as the carcass is conveyed on overhead shackles along a processing path and after the entrails and breast of the carcass have been removed. The apparatus includes a cutting station for cutting through the tissue and muscle in the region of the thigh joint of the poultry carcass and a separating station having a spiked rotating disk for gripping the carcass back portion and pulling it away from the legs to separate the legs from the back. Disposed between the cutting station and the separating station is means for rotating carcass backs about an axis extending between the thigh joints of the carcass to dislodge the balls of the thigh joints from the sockets thereof. With the tissue cut and the balls and sockets dislodged, the back is separated cleanly from the legs and the oysters of the thigh joints are left always on the end of the leg bones to prevent unsightly discoloration and escape of bone marrow.

19 Claims, 5 Drawing Sheets

METHOD AND APPARATUS FOR SEPARATING THE LEGS FROM THE BACK OF A POULTRY CARCASS

TECHNICAL FIELD

This invention relates generally to automated poultry processing and particularly to an apparatus and method for use along an automated poultry processing line to separate the legs of poultry carcasses from the back portions of the carcasses.

BACKGROUND OF THE INVENTION

For many years, chicken and other poultry were processed for sale and human consumption largely by skilled butchers using a variety of sharp knives and other specialized hand tools. Recently, however, the development of automated poultry processing equipment has dramatically increased the speed and efficiency of poultry processing and has thus provided the consuming public with high quality poultry products at reasonable prices.

Most modern poultry processing equipment is designed for use along an overhead conveyor system having an array of spaced depending shackles from which poultry carcasses are suspended by their legs and conveyed along a processing path. Various processing machines are disposed along the processing path for operating upon the suspended carcasses progressively as they move along the path to prepare the poultry for public sale and consumption. A typical poultry processing line might, for example, include a vent cutter, a bird opener, an eviscerator, a neck breaker, a lung puller and a crop remover. In addition, such a processing line might include machines for subdividing poultry carcasses into their various commonly consumed pieces such as breasts, backs, wings, legs, and thighs.

One particular processing step that has proven especially challenging to automate has been the separation of the legs of poultry carcasses from the back portions of the carcasses. This separation is to occur at the thigh joints of the birds. The difficulty in automating this step has resulted in part because of the dense muscles and tough tendons that hold the thigh joints of the poultry carcasses together and the very tightly coupled nature of the ball and socket thigh joints themselves.

Some prior attempts to separate legs from backs have involved cutting through the carcasses at the thigh joints with rotary blades. While cutting the thigh joints in this manner does indeed separate the legs from the back, it usually results in a part of the peritoneum and some fat being left on the legs, which is highly undesirable to the consuming public. Further, such cutting usually severs the bones of the thigh joints rather than separating the joints, thus leaving at least a portion of the joint oyster on the back portion of the carcass. The oyster should remain intact on the end of the thigh bone for a neat appearance and to prevent leakage of marrow from the thigh bone into the edible meat.

Other previously employed methods for separating poultry legs from backs have included pulling the legs from the back rather than cutting through the joint. An example of such a method and an apparatus for performing the method is illustrated in U.S. Pat. No. 4,939,813. While such methods and devices represent an improvement over cutting or slicing through the thigh joints, they nevertheless have exhibited a number of problems and shortcomings inherent in their own respective designs. For example, the pulling apart of the thigh joints in such devices can and often does result in the oyster being left with the back portion of the carcass because of the tightly coupled nature of the joint. Further, the cleanliness of the separations effected by these devices has often not been completely acceptable.

Accordingly, a continuing and heretofore unaddressed need exists for a method and apparatus adapted to be used along an automated poultry processing line for reliably and cleanly separating the backs from the legs of poultry carcasses moving along the line. Such a method and apparatus should provide clean separations at the carcass thigh joints and should consistently and reliably leave the oysters of the joints attached to the separated ends of the thigh bones. It is to the provision of such a method and apparatus that the present invention is primarily directed.

SUMMARY OF THE INVENTION

The present invention in one preferred embodiment thereof comprises an automated apparatus for separating the legs from the backs of poultry carcasses as the carcasses are conveyed on overhead shackles along a processing path and after the entrails and breasts of the carcasses have already been removed. The apparatus includes a frame adapted to be positioned beneath and generally along the path of movement of poultry carcasses to be processed. A cutting station on the frame is adapted to receive a poultry carcass and effect a pair of incisions in the tissue of the carcass substantially at the location of the thigh joints thereof. The cutting station includes a pair of fixed blades for initially cutting through the soft outer tissue of the carcass and a pair of yieldably mounted blades for effecting a subsequent cut through the tough muscles and tendons surrounding the thigh joint. The yieldable mounting of the second pair of blades allows for movement of the blades upon their engaging a bone of the carcass to ensure that the bone itself is not cut. This prevents the creation of bone slivers that can contaminate the finished product.

A separating station is mounted on the frame and positioned to receive poultry carcasses subsequent to their movement through the cutting station. The separating station functions to pull the back portions of the carcasses away from the shackled legs and thereby separate the legs from the backs. The separating station includes a vertically oriented rotating disk that has outwardly projecting spiked teeth positioned to engage and seize the back portions of the carcasses as they move along the processing path. The backs are then drawn around the periphery of the rotating disk and thus pulled away from the legs of the carcasses, which remain in the shackles of the overhead conveyor. The separated backs can then be deposited in a receptacle while the suspended legs continue along the processing path for further processing.

Disposed between the cutting station and the separating station of the apparatus is an upstanding crooked bar positioned to engage and arrest the forward movement of the leading edge of a carcass back portion as the carcass moves along the processing path. As a consequence, the legs of the carcass, which continue to be conveyed along by the shackles, tend to pull the trailing edge of the back up and over the arrested leading edge causing the back to rotate about an axis extending between the thigh joints of the carcass. This rotation or tumble action causes the balls of the thigh joints to be dislodged or rolled out of the sockets of the joints. Thus, when the back is pulled away from the legs at the separating station, only tissue and not the joint itself must be separated. The result is an exceptionally clean separation with the oysters of the thigh joints remaining on the ends of the leg bones as desired.

Thus, it is an object of this invention to provide an improved method and apparatus for separating the back portions from the legs of poultry carcasses as the carcasses are conveyed along a processing path.

It is a further object of the invention to provide a method and apparatus of the type described wherein the balls of poultry carcass thigh joints are dislodged from the sockets of the joints before the back is pulled away from the legs.

Another object of the invention is to provide a poultry leg processor wherein legs and backs of poultry carcasses are separated cleanly and reliably with the oysters of the thigh joints remaining always on the ends of the thigh bones after separation.

An additional object of the invention is to provide such a method and apparatus that can be used with existing overhead shackle-type poultry processing lines.

These and other objects, features and advantages of the invention will become more apparent upon review of the following detailed description taken in conjunction with the accompanying drawings.

DETAILED DESCRIPTION OF THE PREFERRED EMBODIMENT

Figure 1:
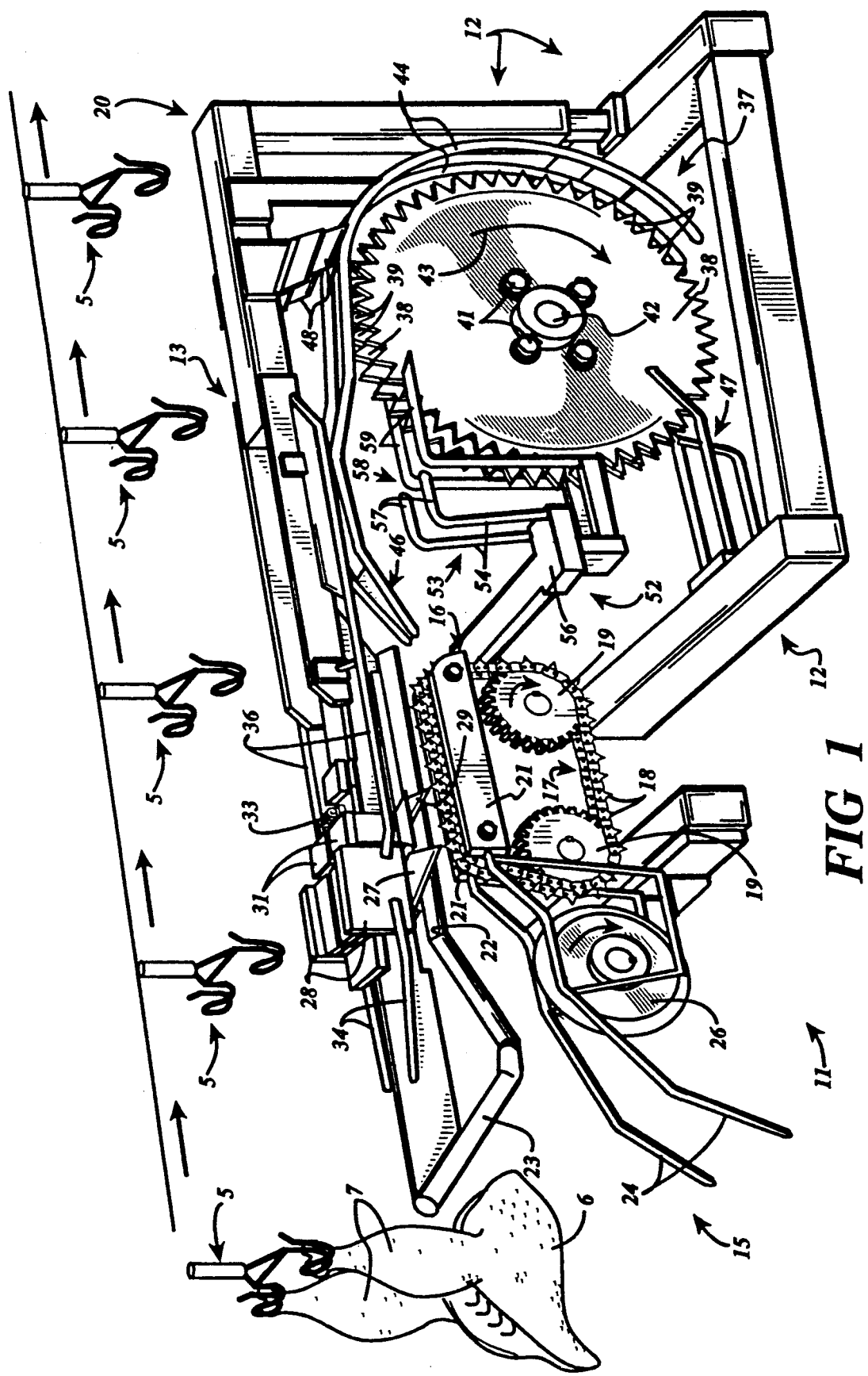
FIG. 1 is a perspective view of an apparatus that embodies principles of the present invention in a preferred form.

This invention is intended for use in conjunction with an overhead poultry conveyor system of the type commonly used in poultry processing plants to convey poultry carcasses along a path for processing. As seen in FIG. 1, such conveyor systems usually include an array of depending shackles 5 from which poultry carcasses are suspended by their legs and conveyed along the processing path. Each of the shackles 5 usually is formed from a bent metal bar configured to receive the ankle joints of poultry legs so that the poultry carcasses are held securely and conveyed along the processing path in an inverted suspended orientation as illustrated at the left-most shackle of FIG. 1.

Various processing machines are disposed along the processing path for operating upon the suspended carcasses progressively as they move along the path to prepare the poultry for public sale and consumption. A typical poultry processing line might, for example, include a vent cutter, a bird opener, an eviscerator, a neck breaker, a lung puller, and a crop remover. Machines for subdividing poultry carcasses into their various commonly consumed pieces such as breasts, backs, wings, legs, and thighs might also be disposed along the path.

The present invention is an apparatus for use along the poultry processing path to separate the legs of a poultry carcass from the back portion thereof. The apparatus is configured to receive poultry carcasses after they have been eviscerated and after the breasts have been removed such that only the back portion 6 (FIG. 1) and the legs 7 remain. The legs 7 are firmly attached to the back 6 at the thigh joints, which are tightly coupled ball and socket type joints surrounded by tough muscle and tendons covered by outer skin and tissue.

Referring now in more detail to the drawings, in which like numerals refer to like parts throughout the several views, FIG. 1 illustrates an apparatus 11 that embodies principles of the present invention in a preferred form. The apparatus 11 comprises a frame 12 that includes an upper support member 13 extending generally along and beneath the shackles 5 of an overhead conveyor system. The apparatus 11 has an upstream end 15, which is positioned to receive poultry carcasses moving along the processing path, and a downstream end 20, from which processed carcasses leave the apparatus.

Mounted at the upstream end of the apparatus 11 is a cutting station 16 adapted to effect pairs of incisions in the tissue of poultry carcasses substantially at the locations of their thigh joints as the carcasses move through the cutting station. The cutting station 16 comprises a conveyor chain 17 having an array of outwardly protruding spiked teeth 18. The conveyor chain 17 extends about a set of sprockets 19, the upper pair of which is captured between guide plates 21 and thus not visible in the drawing of FIG. 1. The upper flight of chain 17 extends between and along the top edges of the guide plates 21 such that the spiked teeth 18 of the chain's upper flight extend upwardly from between the plates 21. At least one of the sprockets 19 is driven in a clockwise direction as shown to move the upper flight of the chain in a direction extending from the upstream end of the apparatus 11 toward the downstream end thereof.

An inverted V-shaped metal guide 22 is secured to the upper support member 13 and extends along and overlies the upper flight of the conveyor chain 17. In operation, the back portion 6 of a moving poultry carcass is captured between the guide 22 and the upper flight of the chain 17, where it is grasped by the spiked teeth 18 of the chain and pulled along through the cutting station 16. Guide bars 23 and 24 form a mouth of the apparatus that is configured to receive poultry backs as the carcasses are drawn along the processing path, align the backs, and direct them to the cutting station 16. An optional rotating disk cutter 26 is disposed just below a portion of the guidebars 24 and can be raised if desired to slice the poultry back apart as it moves between guidebars 23 and 24. This might be done, for example, when it is desired to leave each leg attached to half of the back and bypass the operation of apparatus 11.

Figure 4:
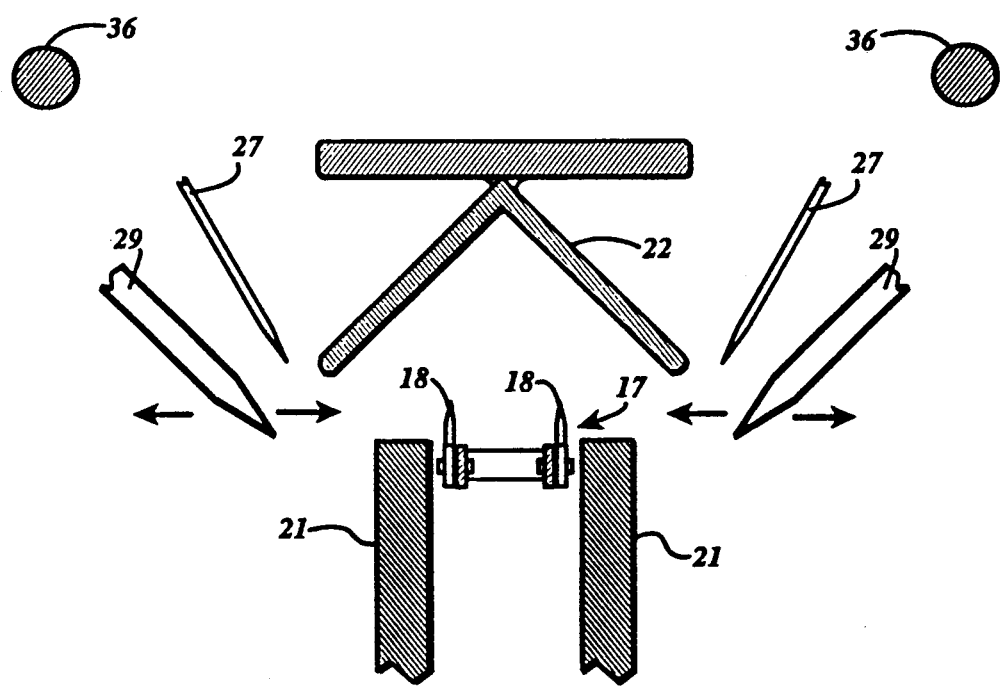
FIG. 4 is a sectional view taken along line A—A of FIG. 2 and showing the V-shaped guide plate, the blades of the cutting station and the spiked teeth chain conveyor for moving poultry carcass backs through the cutting station.
Figure 8:
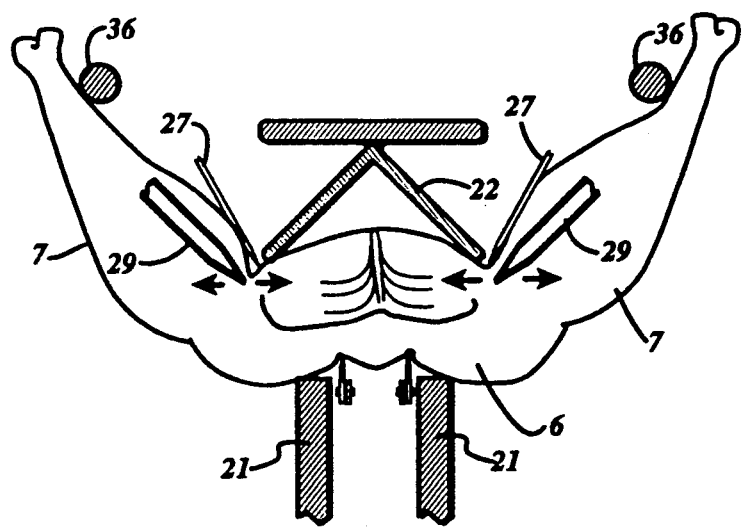
FIG. 8 illustrates positioning of a carcass in the cutting station and cutting of the tissue at the thigh joints of the carcass.

Mounted to the upper support member 13 and straddling the upstream end portion of the guide 22 is a pair of fixed cutter blades 27, only one of which is visible in the drawing of FIG. 1. As best seen in FIGS. 4 and 8, the fixed cutter blades 27 extend downwardly on either side of the V-shaped guide 22 and are positioned to effect incisions in the skin and outer tissue of a poultry carcass generally at the location of its thigh joints as the carcass moves through the cutting station. The blades 27 are adjustably secured to the upper support member 13 by means of mounting blocks 28, which preferably are provided both with vertical and horizontal adjustments to position the blades 27 in a desired location relative to the V-shaped guide 22.

Also mounted to the upper support member 13 on the downstream side of fixed blades 27 and straddling the V-shaped support 22 are a pair of movable cutter blades 29. Each of the blades 29 is secured to a mounting block 31 that is in turn pivotally mounted at 32 (FIG. 3) to the upper support member 13. The downstream ends of the pivotally mounted blocks 31 are yieldably coupled together by means of a spring 33 such that the blocks 31 and blades 29 secured thereto are spring biased toward a predetermined position but can be spread apart against the bias of the spring 33. In this way, each of the blades 29 is movable laterally with respect to the upper support member 13 against the bias of spring 33. The blades 29 can therefore move when they encounter a bone of a carcass to prevent cutting into or through the bone and thus to prevent the production of undesirable bone slivers. The tension of spring 33 is chosen to provide sufficient blade pressure to cut through the tough muscles and tendons that surround the thigh joint but insufficient tension to cut through the bones themselves.

Pairs of opposed spreader bars 34 and 36 straddle the upper support member 13 and extend generally therealong. The spreader bars 34 and 36 function to spread the legs 7 of poultry carcasses apart as they move through the cutting station 16 to tension the tissue of the carcass in the region of the thigh joints so that clean incisions can be effected by the fixed blades 27 and the movable blades 29. Spreading of the legs also tends to pull the outer skin and tissue apart as the first incision is made to expose the underlying muscle and tendons. In this way, the second incision can be made in the exposed muscle and tendons without interference from the external skin and tissue of the carcass.

Secured at the downstream end 20 of the apparatus 11 is a separating station 37 adapted to pull the back portions of poultry carcasses away from the carcass legs, which remain secured within shackles 5. The separating station 37 comprises a pair of closely spaced juxtaposed metal disks 38 with each disk having an array of spiked teeth 39 formed about and protruding from its periphery. The disks 38 are coupled together by bolts 41 and are secured to a driven shaft 42, which rotates the disks 38 in a clockwise direction as indicated by arrow 43 in FIG. 1.

A pair of metal guidebars 44 have upstream ends 46 positioned adjacent to the cutting station 16. The guidebars 44 extend from their upstream ends toward the downstream end of the apparatus 11 where they curve partially around and are spaced from the spiked periphery of disks 38 and terminate at the bottoms of the discs. With this configuration, the back portions 6 of poultry carcasses that move into the separating station are captured between the spiked teeth of disks 38 and the guidebars 44 so that the teeth 39 can grasp the back portion firmly and pull it downwardly away from the legs and around the periphery of the disks to separate the back from the legs. The separated back is then dislodged from the disks 38 at the bottom of the apparatus by means of a set of prongs 47, two of which extend from the frame 12 to straddle the disks 38 and one of which extends between the disks 38 to dislodge any debris that may become stuck there. The separated backs can then be collected beneath the apparatus in a receptacle (not shown). The separated legs, which remain with their shackles, are conveyed further along the processing path for additional processing or collection.

Figure 6:
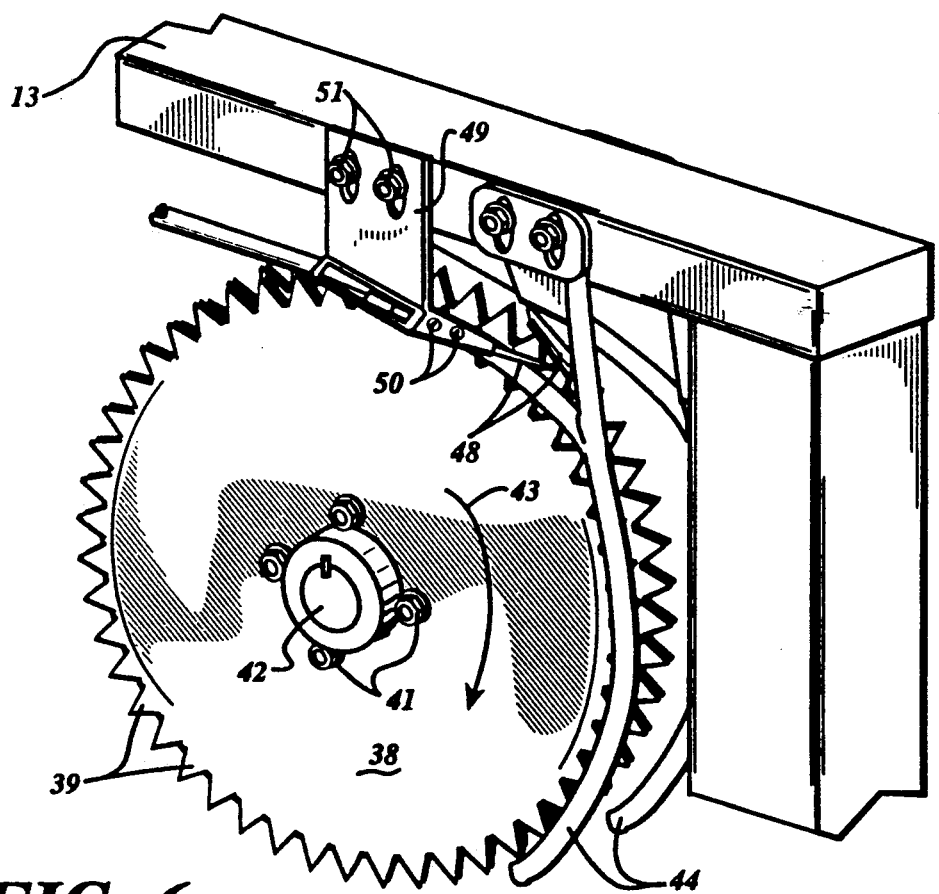
FIG. 6 is a partial perspective view showing the separating station of the invention for pulling poultry backs away from the legs to separate the backs from the legs.

A third pair of cutter blades 48 are mounted to the upper support member 13 and extend toward the periphery of disks 38. The blades 48 function to effect a final incision in the tissue of poultry carcasses just before the backs are pulled away from the legs to ensure an even cleaner separation. As best seen in FIG. 6, the blades 48 are secured within mounts 49 that are in turn adjustably secured to upper support member 13 by means of bolts 51. In this way, the positions of blades 48 can be adjusted as needed to effect their incisions in the proper locations. The guidebars 44 are also adjustably mounted to the upper support member 13 so that the spacing between bars 44 and the periphery of disks 38 can be adjusted as needed.

Disposed between the cutting station 16 and the separating station 37 is an assembly 52 for causing the back portions of poultry carcasses to be rotated with respect to the legs prior to entering the separating station 37. The assembly 52 comprises a pair of spaced inverted L-shaped metal bars 53 having substantially vertically oriented legs 54. The vertically oriented legs 54 are secured at their lower ends to a mounting block 56 and extend upwardly therefrom. The L-shaped bars 53 also have upper legs 57 that extend generally horizontally toward the upper peripheral portion of the disks 38 of the separating station 37. A second pair of L-shaped bars 58 are disposed on the downstream side of bars 53 and include horizontally oriented legs 59 that are generally co-extensive with the horizontally oriented legs 57 of bars 53 and extend to distal ends that straddle an upper peripheral portion of the spiked disks 38.

As more fully detailed below, the vertically oriented legs 54 of bars 53 function to engage and arrest the forward motion of the leading edges of poultry carcass backs as the carcasses leave the cutting station and move toward the separating station. The trailing edges of the backs are then pulled by the moving legs up and over the arrested leading edges to tumble or rotate the backs between the legs through an angle of approximately 180°. Such rotation tends to roll the balls of the thigh joints out of the sockets thereof to dislodge the balls from the sockets before the backs are pulled away from the legs at the separating station 37. With a back thus rotated, it is guided into the teeth of disks 38 by the co-extensive horizontal legs 57 and 59 of bars 53 and 58 respectively. Here, a third pair of incisions are made by blades 48 in the tissue of the carcass on the opposite side of the back from the incisions that were made at the cutting station. The back is then pulled around the periphery of discs 38 and thus away from the shackled legs to separate the legs from the back.

Figure 2:
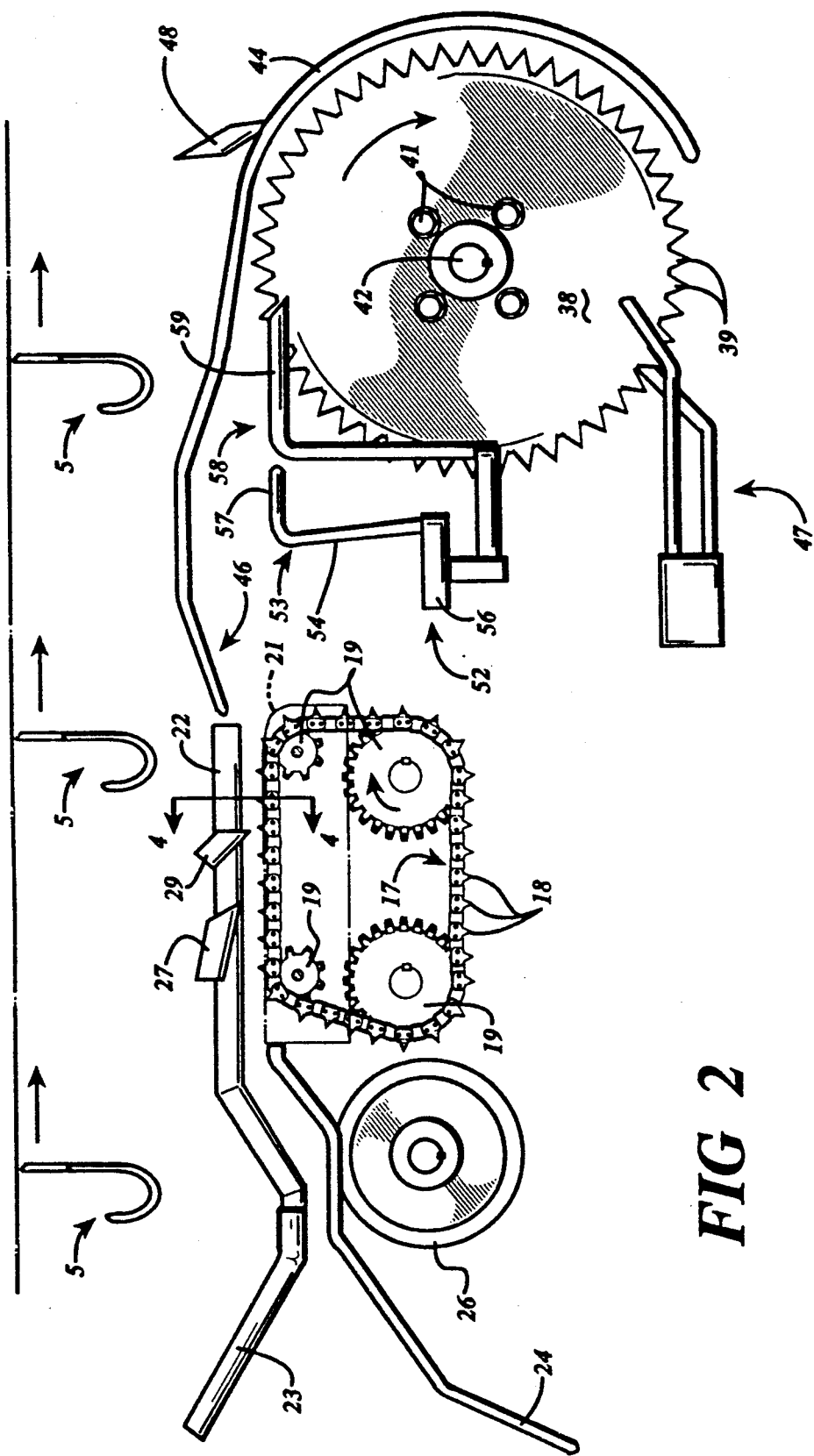
FIG. 2 is a side elevational view of the apparatus of FIG. 1 with mounting hardware and the like removed to reveal the functional elements of the apparatus.

FIG. 2 is a side elevational view of the apparatus of FIG. 1 illustrating relative placement of functional elements thereof and shown with non-functional elements omitted for clarity. Movable cutting blades 29 are seen in FIG. 2 to extend closer to the upper flight of conveyor chain 17 than fixed blades 27. In this way, fixed blades 27 can effect a first incision in the outer skin and tissue of the carcasses and blades 29 can effect a second incision that extends through the tough muscle and tendons and to the bones adjacent to the thigh joint itself. Guidebars 44 are seen to be formed at their upstream ends 46 with a raised portion to accommodate the rotation or tumble action of poultry carcass backs in this region of the apparatus.

Figure 3:
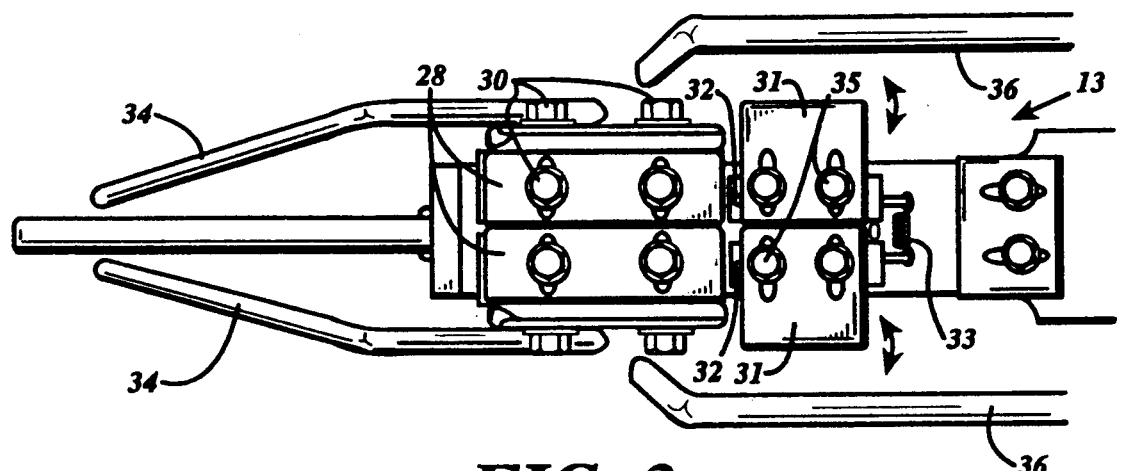
FIG. 3 is a top plan view of the cutting station portion of the invention showing means for mounting the cutting blades to the frame.

FIG. 3 is a top elevational view of the mounting blocks 28 and 31 for securing blades 27 and 29 to the upper support member 13 of the apparatus. Each of the mounting blocks 28 is seen to be adjustable both vertically and horizontally by means of bolts 30. In this way, fixed blades 27 can be accurately positioned to effect their incisions at the proper place in poultry carcasses moving through the cutting station 16. Similarly, mounting blocks 31 are adjustable by means of bolts 35 so that the initial predetermined spring-biased positions of movable blades 29 can be set according to the size and configuration of poultry carcasses to be processed. Spreader bars 34 and 36 straddle and extend along the upper support member 13 at the position of mounting blocks 28 and 31 to spread the legs of poultry carcasses as they move through the cutting station and thus tension the tissue so that clean incisions can be made by blades 27 and 29.

FIG. 4 is a sectional view of the cutting station 16 of apparatus 11 taken along line A—A of FIG. 2. The inverted V-shaped guide 22 is seen to overlie the upper flight of conveyor chain 17 and the spiked teeth 18 thereof. Fixed cutting blades 27 straddle the guide 22 and extend generally downwardly toward the guide plates 21 of the conveyor chain assembly. Similarly, movable blades 29 also straddle the guide 22 and extend generally downwardly toward the guide plates 21. Spreader bars 36 are disposed above and on either side of the cutting station 16 to engage and spread the legs of poultry carcasses as they are cut by blades 27 and 29, as more specifically detailed below.

Figure 5:
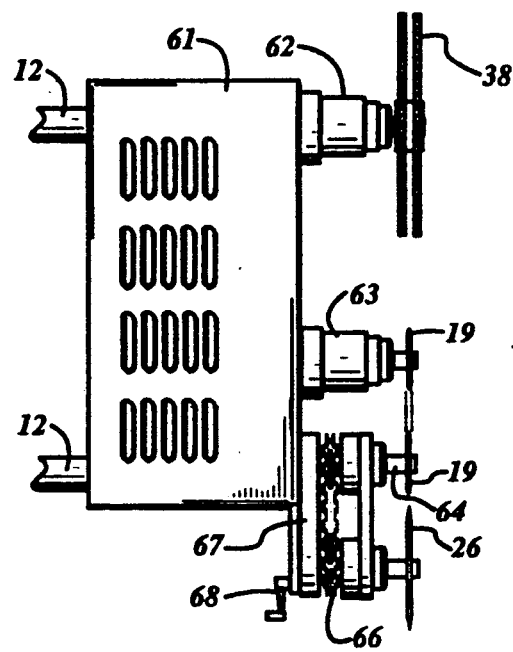
FIG. 5 is a top plan view of a portion of the apparatus showing the interconnections of the drive train for driving the various moving elements of the invention.

FIG. 5 illustrates one preferred method of driving the spiked disks 38, conveyor chain 17, and rotating cutter 26. Such drive systems are common in this art and will not be described in detail here. Of course, any drive train configuration suitable for rotating the movable elements of the invention would function with equal satisfaction.

Referring to FIG. 5, a housing 61 is supported upon frame 12 and preferably houses a conventional electric motor and transmission system (not shown). The transmission is coupled through bushings 62 and 63 to spiked disks 38 and to one of the sprockets 19 of the conveyor chain assembly 17. The other lower sprocket of the conveyor chain assembly is driven by the conveyor chain 17 itself. This sprocket, in turn, rotates its axle 64, which is coupled via chain 66 to rotate the cutter 26. The cutter 26 is mounted within the free end of a mounting block 67 that is pivotally secured at its other end to the housing 61. A locking mechanism 68 is provided so that the blade 26 can be locked in a raised or lowered position as desired. With this configuration, all of the moving parts of the apparatus are rotated in unison by means of the drive system housed within housing 61.

FIG. 6 is a partial perspective view of the separating station of the apparatus showing more clearly the relative positioning of the disks 38, guidebars 44, and cutter blades 48. Blades 48 are seen to be secured within their respective holders by means of screws 50. In this way, the blades can be removed easily when dull and replaced with new blades. In addition, the screws 50 permit further adjustability of the position of the blades to correspond to the size and shape of carcasses being processed.

OPERATION

Figure 7:
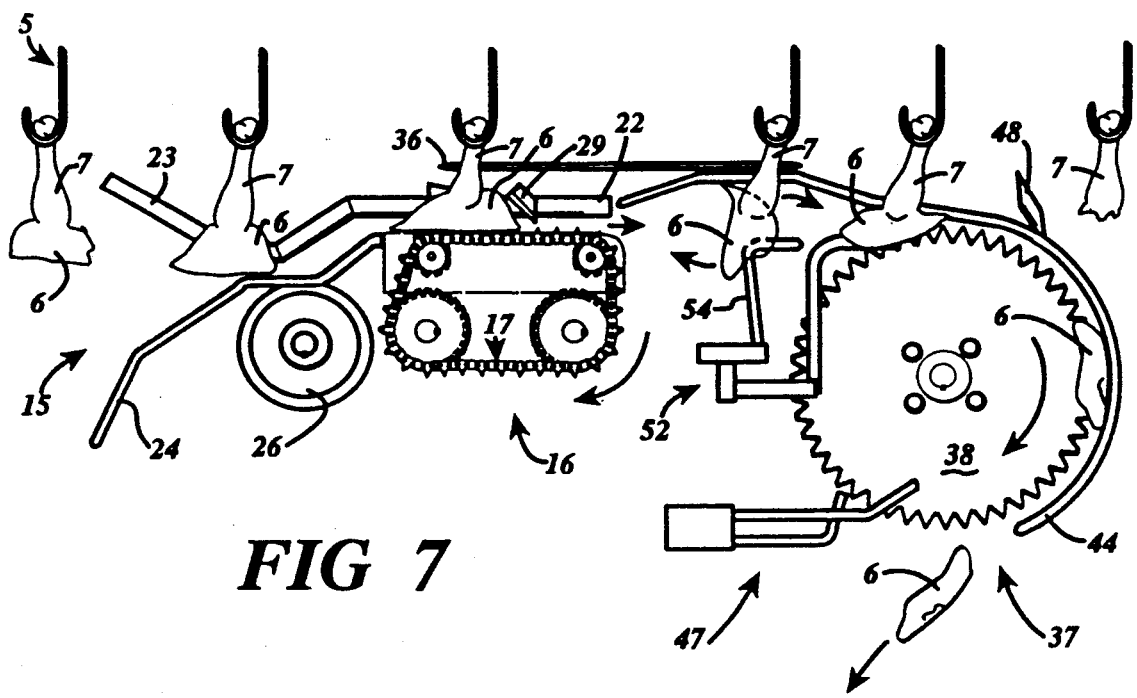
FIG. 7 is a side elevational view of the invention showing progressive processing of poultry carcasses as they are conveyed through the apparatus.

The operation of the just described apparatus to perform the method of the present invention will be described in more detail with reference to FIGS. 7 and 8. FIG. 7 illustrates the progressive movement through the apparatus of a poultry carcass from which the entrails and breast have previously been removed. The carcass is seen to be suspended by its legs 7 with its back portion 6, which remains after previous operations, being attached to the legs at the thigh joints.

Poultry thigh joints are ball and socket type joints and are surrounded by tough tissue and tendons that hold the joints together. The ball portion of the joint is on the lower end of the leg bones and the socket portion is formed in the hip portion of the back 6. A white cartilage oyster, which is generally cup shaped and functions as a friction reducing bearing, is captured between the ball and the socket and generally covers the ball end of the leg bone. As previously mentioned, it is highly desirable when separating the back from the legs to leave the oyster attached to the end of the leg bone to prevent bone marrow from discoloring the meat of the leg and thus to prevent an unsightly and potentially unsanitary finished product.

As the carcasses are moved toward the apparatus by the shackles 5, their backs 6 are in an upwardly cupped orientation with the outside of the back facing down and the inside, to which the backbone and a portion of the ribs are attached, facing up. The back portion 6 is then engaged by the diverging guidebars 23 and 24, which align the back and deliver it to the cutting station 16. In normal operation, the rotating cutter 26 is in its lowered configuration and has no effect on a carcass moving between the bars 23 and 24. In instances where it is desired simply to cut the back apart and leave a portion of the back attached to each leg, the cutter 26 can be raised, thereby cutting the back and bypassing the operation of the present invention.

As the carcass passes the location of rotating cutter 26, the back 6 is pulled by the legs along the space between bars 23 and 24 and to the upstream end of the cutting station 16. At this position, the back 6 of the carcass has been engaged and aligned by the inverted V-shaped guide 22 (FIG. 8). In addition, the inner calves of each leg 7 begin to engage the spreader bars 36, which aid in the centering of the back and which tend to spread the legs 7 to tension the tissue, muscles, and tendons that surround the thigh joint of the carcass.

With the carcass thus positioned and centered at the upstream end of the cutting station 16, the lower side of the back 6 is grasped by the spiked teeth of the upper flight of conveyor chain 17. As the upper flight of chain 17 moves to the right in FIG. 7, its spiked teeth grasp and draw the back 6 through the cutting station and past the fixed blades 27 and movable blades 29. As the carcass is drawn past these blades, the fixed blades 27 effect a first incision in the carcass at the approximate location of the thigh joint. This first incision extends generally along the direction of the thigh bone toward the bones of the back. The first incision does not cut all the way to the bone but rather cuts only the outer skin and tissue of the carcass, which, because of the tensioned legs, is pulled apart to form a cleavage in the carcass thus exposing the underlying muscle and tendons.

After the first incision has been made, the carcass is drawn by the upper flight of chain 17 past the movable blades 29, which extend lower than fixed blades 27 so as to cut all the way to the bone of the carcass. These blades effect a second incision in the carcass that extends to the bone thereby cutting the tough muscle and tendons surrounding the thigh joint. When the cutting edge of the blade contacts the bone, the blades yield against the bias of spring 33 so that the bone itself is not cut. This ensures that bone slivers that can be created in the course of prior art methods are never generated and thus are never found in the meat of the final product and further ensures that the muscle and tendons are cut cleanly all the way to the bone.

With the two incisions having been effected by fixed blades 27 and movable blades 29, the carcass is ejected from the cutting station 16 on the downstream end thereof and the back 6 of the carcass moves into the space between the cutting station 16 and the separating station 37. As the carcass is moved further by the shackles 5, the leading edge of the back 6 engages the upper part of vertically oriented legs 54 of assembly 52. The forward movement of this leading edge is thus arrested by the vertically oriented legs 54. Further movement of the carcass legs 7 by the shackles 5 tends to pull the trailing edge of the back 6 up and over the leading edge thereof as illustrated by the arrows in FIG. 7. The back 6 is thus rotated or tumbled about an axis that extends substantially through the thigh joints of the carcass. As this rotation occurs, the balls of the thigh joints are rolled out of or dislodged from the sockets of the joints in such a way that the oysters of the joints remain always intact on the ends of the leg bones. The thigh joints of the carcass are thus separated by the rotation of the back with respect to the legs.

As the legs 7 are drawn further by the shackles, the back completes a full 180° rotation such that the previously cut inner portion of the back is now facing down. The back is then guided by the horizontally oriented legs 57 and 59 of L-shaped bars 53 and 58 into the separating station 37, where the back 6 becomes captured between the spiked periphery of disks 38 and the arcuate portion of guidebars 44. The spiked teeth of disks 38 then engage and grasp the back and begin to pull it about the periphery of the disks 38.

Just as the back 6 begins to be drawn downwardly by the disks 38, cutter blades 48 effect a third and final incision in the carcass on the opposite side of the back relative to the first two incisions thus cutting through the skin and tissue at that location. At this point, the ball and socket joints are dislodged and only a small amount of tissue remains intact holding the legs to the back.

The back 6 is then drawn by the rotating disks 38 downwardly and away from the suspended leg 7, thus tearing any remaining uncut tissue and separating the back 6 from the legs 7. The legs 7 are then moved on by the shackles 5 to further processing stations for collection and packaging. The separated backs 6, which are generally unfit for human consumption but can be used for animal feed and the like, move on around the disks 38 to the bottom portion thereof where they are ejected and can be collected in a receptacle. If a back should become stuck on the spiked teeth of the disks 38, it simply continues around the periphery of the discs until engaged by the prongs 47, which dislodge the back so that it can fall downwardly into the receptacle.

In practice, the shackles 5 are approximately two to three feet apart and each is loaded with a poultry carcass. Serial processing of poultry carcasses is thus accomplished quickly and efficiently by the apparatus and method of this invention. Furthermore, in the preferred embodiment the rotation rate of sprockets 19 is chosen so that the upper flight of conveyor chain 17 moves faster than the rate of movement of shackles 5. In this way, the carcass is moved quickly past the blades 27 and 29 such that clean accurate cuts can be made. In addition, the rotation rate of disks 38 is preferably greater than the rate of movement of shackles 5 so that the backs 6 are pulled quickly and cleanly from the suspended legs 7.

The invention has been described herein in terms of a preferred embodiment and a preferred methodology. It will be obvious to those of skill in the art, however, that various additions, deletions, and modifications might well be made to the illustrated embodiments within the scope of this invention. For example, any suitable method might be used for drawing the back portion of carcasses past the blades 27 and 29. The spiked conveyor chain of the preferred embodiment is therefore presented for illustrative purposes only. In addition, various methods of pulling the backs 6 away from the suspended legs 7 might be employed in place of the rotating disks 38 of the preferred embodiment. Finally, any suitable method of causing rotation of the backs 6 with respect to the legs 7 might be employed, it being the rotation itself that dislodges the ball and socket joint as desired. These and many other modifications, additions, and deletions might well be made to the illustrated embodiment without departing from the spirit and scope of the invention as set forth in the claims.

I claim:

1. For use along a poultry processing line of the type having a spaced array of overhead-shackles mounted for movement along a processing path with the shackles being configured to suspend poultry carcasses by their legs and convey the suspended carcasses along the path for processing, an apparatus for separating the legs from the back portions of poultry carcasses from which the entrails and breasts have previously been removed, said apparatus comprising:

a frame disposed beneath and generally along the path of movement of the spaced array of shackles;

a cutting station on said frame with said cutting station being adapted to receive a poultry carcass being conveyed along the processing path and effect at least one incision in the carcass substantially at the location of a thigh joint thereof;

a separating station on said frame with said separating station being positioned to receive a poultry carcass being conveyed along the processing path subsequent to movement of the carcass through said cutting station, said separating station being adapted to grasp the back portion of the poultry carcass and pull the grasped back portion away from the legs of the carcass to separate the legs from the back portion at the thigh joints of the carcass; and means disposed between said cutting station and said separating station for rotating the back portion of a poultry carcass relative to the legs thereof through an arc sufficient to dislodge the balls and sockets of the thigh joints so that the back portion of the carcass can be separated cleanly at the thigh joints from the legs of the carcass at said separating station.

2. An apparatus for separating the legs from the back portions of poultry carcasses as claimed in claim 1 and wherein said cutting station includes a first pair of blades positioned to effect a first pair of incisions in a carcass substantially at the locations of the thigh joints thereof as the carcass moves through said cutting station.

3. An apparatus for separating the legs from the back portion of poultry carcasses as claimed in claim 2 and wherein said cutting station further includes a second pair of blades positioned to effect a second pair of incisions in a carcass substantially at the locations of the thigh joints thereof and subsequent to the making of the first pair of incisions, said second pair of blades being movably secured to said frame and yieldably biased toward poultry carcasses moving through said cutting station whereby the second pair of blades can yield upon engaging a bone of the carcass to avoid cutting the bone and thus to avoid creation of bone slivers.

4. An apparatus for separating the legs from the back portions of poultry carcasses as claimed in claim 2 and wherein said cutting station includes guide means for aligning the thigh joints of a poultry carcass with said first pair of blades for accurate placement of the first pair of incisions and means for gripping the carcass and conveying it past said first pair of blades to effect the first pair of incisions.

5. An apparatus for separating the legs from the back portions of poultry carcasses as claimed in claim 4 and wherein said guide means comprises an inverted V-shaped guide bar positioned to bear upon the back portion of a carcass moving through said cutting station to align the thigh joints of the carcass with said first pair of blades.

6. An apparatus for separating the legs from the back portions of poultry carcasses as claimed in claim 5 and wherein said means for gripping the carcass and conveying it past said first pair of blades comprises a moving chain conveyor having a flight extending at least partially along and underlying said V-shaped guide bar, said conveyor flight being spaced from said guide bar a distance sufficient to capture the back portion of a poultry carcass between said V-shaped guide bar and said chain conveyor flight as the carcass moves through said cutting station, said moving chain conveyor having an array of spaced spiked teeth projecting outwardly therefrom and configured to grasp the back portion of a poultry carcass and convey it past said first pair of blades as said chain conveyor flight moves along said V-shaped guide bar.

7. An apparatus for separating the legs from the back portions of poultry carcasses as claimed in claim 1 and further comprising spreader means on said frame for spreading the legs of a poultry carcass as it passes through said cutting station to tension the tissue of the carcass as the incision is made therein.

8. An apparatus for separating the legs from the back portions of poultry carcasses as claimed in claim 7 and wherein said spreader means comprises a pair of spaced spreader bars straddling said cutter station with said spreader bars being positioned to bear against the inner thighs of a poultry carcass moving through said cutter station and urge the legs of the carcass apart to tension the tissue thereof.

9. An apparatus for separating the legs from the back portions of poultry carcasses as claimed in claim 1 and wherein said separating station comprises a rotating disk having peripheral outwardly projecting spiked teeth and an arcuate guide member extending partially about and being spaced from the periphery of said disk, said disk and guide member being configured and positioned to capture the back portion of a poultry carcass moving into said separating station between the spiked periphery of said rotating disk and said guide member to pull the back portion around the disk periphery and away from the legs of the poultry carcass to separate the back portion from the legs.

10. In an automated poultry processing system of the type having a spaced array of overhead shackles mounted for movement along a processing path with the shackles being configured to suspend poultry carcasses by their legs and convey the suspended carcasses along the path for processing, a method of separating the legs from the back portion of a poultry carcass from which the entrails and breast have previously been removed as the carcass is conveyed along the processing path, said method comprising the steps of:
 (a) effecting a first pair of incisions in the tissue of the carcass substantially at the locations of the thigh joints thereof as the carcass moves along the processing path;
 (b) rotating the back portion of the carcass relative to the legs thereof through an arc sufficient to dislodge the ball from the sockets of the thigh joints of the carcass; and
 (c) pulling the back portion of the carcass away from the legs thereof to separate the back portion from the legs substantially at the location of the thigh joints.

11. A method of separating the legs from the back portion of a poultry carcass as claimed in claim 10 and wherein step (a) further comprises effecting a second pair incisions in the tissue of the carcass substantially at the locations of the thigh joints thereof with the second pair of incisions extending to a bone of the carcass.

12. A method of separating the legs from the back portion of a poultry carcass as claimed in claim 10 and where in step (b) the back portion of the carcass is rotated about an axis extending substantially between the thigh joints of the poultry carcass whereby the balls of the thigh joints are rolled out of the sockets thereof to dislodge the balls from the sockets for a clean separation of the back portion of the carcass from the legs thereof.

13. A method of separating the legs from the back portion of a poultry carcass as claimed in claim 10 and wherein step (c) comprises providing a rotating disc having outwardly projecting peripheral spiked teeth and positioning the rotating disc such that its spiked teeth engage and seize the back portion of the poultry carcass and convey the back portion about the periphery of the rotating disc to pull the back portion away from the legs as the legs are conveyed by the shackles along the processing path.

14. A method of separating the legs from the back portion of a poultry carcass as claimed in claim 10 and wherein step (b) comprises engaging and arresting forward movement of the leading edge of the back portion as the carcass moves along the processing path whereby the trailing edge of the back portion is pulled by the legs up and over the leading edge to rotate the back portion relative to the legs.

15. In an automated poultry processing system of the type having a spaced array of overhead shackles mounted for movement along a processing path with the shackles each being configured to suspend a poultry carcass by its legs and convey the suspended carcass along the path for processing, an apparatus for separating the legs from the back portion of a poultry carcass as the carcass is conveyed along the processing path, said apparatus comprising:

(a) cutting means for effecting a first pair of incisions in the tissue of the carcass substantially at the locations of the thigh joints thereof as the carcass moves along the processing path;

(b) means for rotating the back portion of the carcass relative to the legs through an arc sufficient to dislodge the balls from the sockets of the thigh joints of the carcass; and (c) means for pulling the back portion of the carcass away from the legs thereof to separate the back portion from the legs substantially at the location of the thigh joints.

16. The apparatus of claim 15 and wherein said cutting means further comprises means for effecting a second pair incisions in the tissue of the carcass substantially at the locations of the thigh joints thereof with the second pair of incisions extending to a bone of the carcass.

17. The apparatus of claim 16 and wherein said means for rotating the back portion of the carcass relative to the legs includes means for rotating the back portion of the carcass about an axis extending substantially between the thigh joints of the poultry carcass whereby the balls of the thigh joints are rolled out of the sockets thereof to dislodge the balls from the sockets for a clean separation of the back portion of the carcass from the legs thereof.

18. The apparatus of claim 16 and wherein said means for pulling the back portion of the carcass away from the legs includes a rotating disc having outwardly projecting peripheral spiked teeth and means for positioning the rotating disc such that its spiked teeth engage and seize the back portion of the poultry carcass and convey the back portion about the periphery of the rotating disc to pull the back portion away from the legs as the legs are conveyed by the shackles along the processing path.

19. The apparatus of claim 16 and wherein said means for rotating the back portion of the carcass relative to the legs includes means for engaging and arresting forward movement of the leading edge of the back portion as the carcass moves along the processing path whereby the trailing edge of the back portion is pulled by the legs up and over the leading edge to rotate the back portion relative to the legs.

* * * * *